(12) United States Patent
Li et al.

(10) Patent No.: US 11,892,655 B2
(45) Date of Patent: Feb. 6, 2024

(54) LENS ASSEMBLY AND OPTICAL IMAGE STABILIZATION METHOD FOR SAME

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 772 days.

(21) Appl. No.: 17/017,742

(22) Filed: Sep. 11, 2020

(65) Prior Publication Data

US 2020/0409170 A1 Dec. 31, 2020

Related U.S. Application Data

(63) Continuation of application No. PCT/CN2019/089723, filed on Jun. 1, 2019.

(51) Int. Cl.
*G02B 27/64* (2006.01)
*G02B 7/02* (2021.01)
*H04N 23/55* (2023.01)

(52) U.S. Cl.
CPC ........ *G02B 27/646* (2013.01); *G02B 7/022* (2013.01); *H04N 23/55* (2023.01)

(58) Field of Classification Search
CPC ...... G02B 27/646; G02B 7/022; G02B 27/64; G02B 7/04; H04N 23/55; H04N 5/23248; H04N 5/23264; H04N 5/2328; H04N 5/23287; G03B 2217/005; G03B 2205/00; G03B 2205/0007; G03B 2205/0015; G03B 5/06; G03B 13/36
USPC ....... 359/554, 557; 250/201.1, 201.2, 201.4; 248/208.99, 208.2, 208.12; 396/52, 55
See application file for complete search history.

(56) References Cited

U.S. PATENT DOCUMENTS

| | | | |
|---|---|---|---|
| 2015/0346507 A1* | 12/2015 | Howarth | F03G 7/06 60/527 |
| 2020/0379208 A1* | 12/2020 | Li | G02B 27/646 |
| 2020/0379210 A1* | 12/2020 | Li | G02B 13/001 |
| 2020/0409030 A1* | 12/2020 | Li | F03G 7/065 |
| 2020/0409167 A1* | 12/2020 | Zhang | G03B 3/10 |
| 2021/0072554 A1* | 3/2021 | Li | G02B 27/646 |

FOREIGN PATENT DOCUMENTS

| | | | | |
|---|---|---|---|---|
| CN | 109061827 A | * | 12/2018 | ............. G02B 7/021 |
| JP | 7025558 B2 | * | 2/2022 | ........... G02B 27/646 |

* cited by examiner

*Primary Examiner* — Arnel C Lavarias
(74) *Attorney, Agent, or Firm* — W&G Law Group

(57) ABSTRACT

An invention provides a lens assembly. The lens assembly includes a first substrate, a lens, a first memory alloy wire and a second memory alloy wire, wherein the lens is placed in the first substrate, and the first substrate includes a first side plate and a second side plate that are placed on both sides of the lens. The optical image stabilization lens assembly has the advantages of a simple structure for realizing optical image stabilization and being able to realize miniaturized design. In addition, an optical image stabilization method for the lens assembly is provided.

19 Claims, 9 Drawing Sheets

LENS ASSEMBLY AND OPTICAL IMAGE STABILIZATION METHOD FOR SAME

FIELD OF THE PRESENT DISCLOSURE

The present disclosure relates to optical cameras, in particular to a lens module and an optical image stabilization method for the lens module.

DESCRIPTION OF RELATED ART

In recent years, a high-performance lens module is mounted on a portable terminal such as a smartphone, a tablet computer and so on. The high-performance lens module generally has an auto focusing function and an optical image stabilization function (OIS).

The optical image stabilization function of the lens assembly of a camera in the related art is to drive the lens via a voice coil motor so as to restore the lens to an original position. However, this lens structure is relatively complicated, and it is difficult to achieve miniaturization of the lens module.

Therefore, it is necessary to provide a new lens assembly of a camera to solve the above problems.

SUMMARY OF THE INVENTION

One of the major objects of the invention is to provide a lens assembly of a lens module with OIS function achieved by simplified, small-factor, easily-mounted structure.

For achieving the object mentioned above, the lens assembly comprises:

a lens;

a first substrate attached to the lens, including a first side plate placed at one side of the lens and a second side plate placed at the other side of the lens;

a first memory alloy wire having a first fixing end fixed on the first side plate, a first extension section extending from the first fixing end in a direction of the second side plate and suspended above the lens, a second fixing end fixed to one side of the lens close to the second side plate, a second extension section reversely extending from the second fixing end in the direction of the first side plate and suspended above the lens, and a third fixing end connected with the second extension section and fixed to the first side plate;

a second memory alloy wire having a fourth fixing end fixed on the second side plate, a third extension section extending from the fourth fixing end in a direction of the first side plate and suspended above the lens, a fifth fixing end fixed to the side of the lens close to the first side plate, a fourth extension section reversely extending from the fifth fixing end in the direction of the second side plate and suspended above the lens, and a sixth fixing end connected with the fourth extension section and fixed to the second side plate; wherein a symmetry axes of the first extension section and the second extension section are perpendicular to an optical axis of the lens; and a symmetry axes of the third extension section and the fourth extension section are perpendicular to the optical axis of the lens.

Further, the lens assembly includes a circuit board, wherein the circuit board comprises a first extension portion attached to the first side plate and a second extension portion attached to the second side plate; the first fixing end and the third fixing end of the first memory alloy wire are indirectly fixed to the first side plate via the first extension portion, and the fourth fixing end and the sixth fixing end of the second memory alloy wire are indirectly fixed to the second side plate via the second extension portion.

Further, the lens assembly comprises a first electricity connection terminal provided on the first side plate, and a second electricity connection terminal provided on the second side plate; wherein the first fixing end and the third fixing end are fixed on a circuit board via the first electricity connection terminal, respectively; and the fourth fixing end and the sixth fixing end are fixed on the circuit board via the second electricity connection terminal, respectively.

Further, one side of the lens away from the first side plate is convexly provided with a first convex column; the second fixing end is sleeved at the first convex column; one side of the lens away from the second side plate is convexly provided with a second convex column, and the fifth fixing end is sleeved at the second convex column.

Further, the lens assembly comprises a restoring structure provided between the lens and the first substrate to cooperate with the first memory alloy wire and the second memory alloy wire to restore the deviated lens to an original position.

Further, the first side plate and the second side plate are both provided with a first groove thereon; opposite sides of the lens are convex and reversely provided with a first convex part, the two first convex parts are embedded in the two corresponding first grooves, respectively; each of the first grooves comprises a first side surface and a second side surface that are spaced apart along the optical axis, each of the first convex parts comprises a first surface arranged opposite to the first side surface and a second surface arranged opposite to the second side surface; each of the restoring structure is provided between a surface and the first side surface, and each of the restoring structures comprises a first magnet provided on the first surface and a second magnet provided on the first side surface and magnetically adsorbing the first magnet.

Further, the lens assembly comprises a rolling structure having a first guiding groove that is concavely provided on the lens along a moving direction of the lens, a second guiding groove that is concavely provided at the first substrate along the moving direction of the lens, and a ball embedded between the first guiding groove and the second guiding groove.

Further, each of the second side surfaces is provided with a blocker that restricts the lens from impacting the second side surface.

Further, the lens assembly comprises a stabilization detection mechanism for detecting whether the lens is deflected in a direction perpendicular to the optical axis, wherein the stabilization detection mechanism comprises a third magnet arranged on the lens and a Hall sensor arranged on the circuit board and arranged in alignment with the third magnet.

The invention further provides an optical image stabilization method for a lens assembly described above, wherein when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized; when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
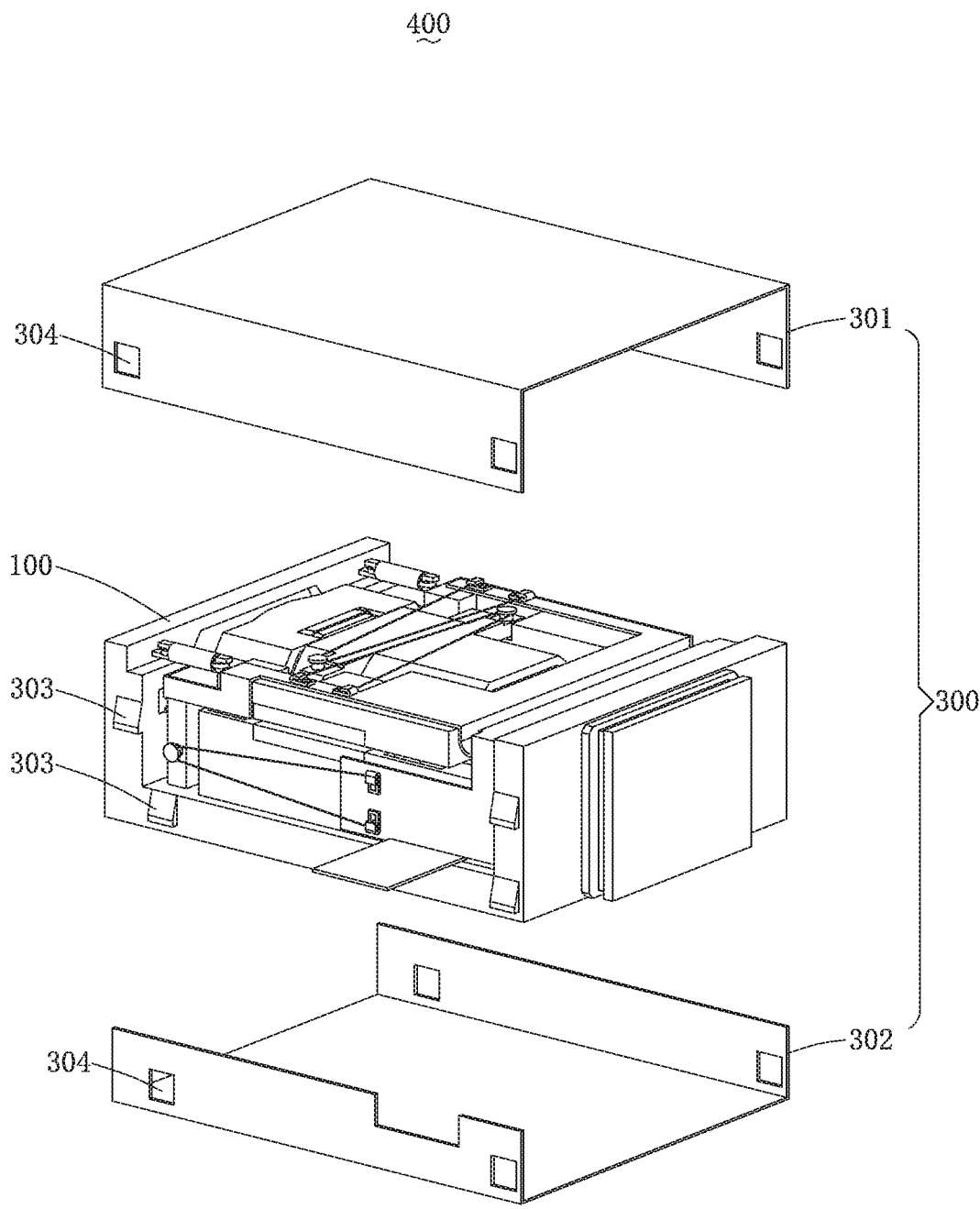
FIG. 1 is a partially exploded view of a lens module in accordance with an exemplary embodiment of the present invention.
Figure 2:
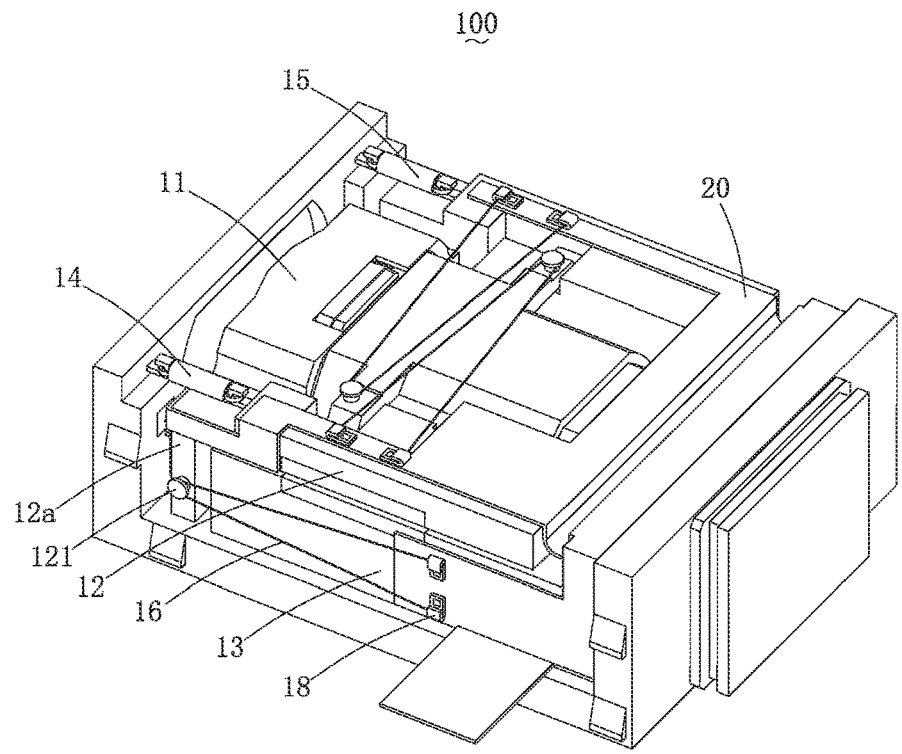
FIG. 2 is an isometric view of a lens assembly of the lens module of the embodiment.
Figure 3:
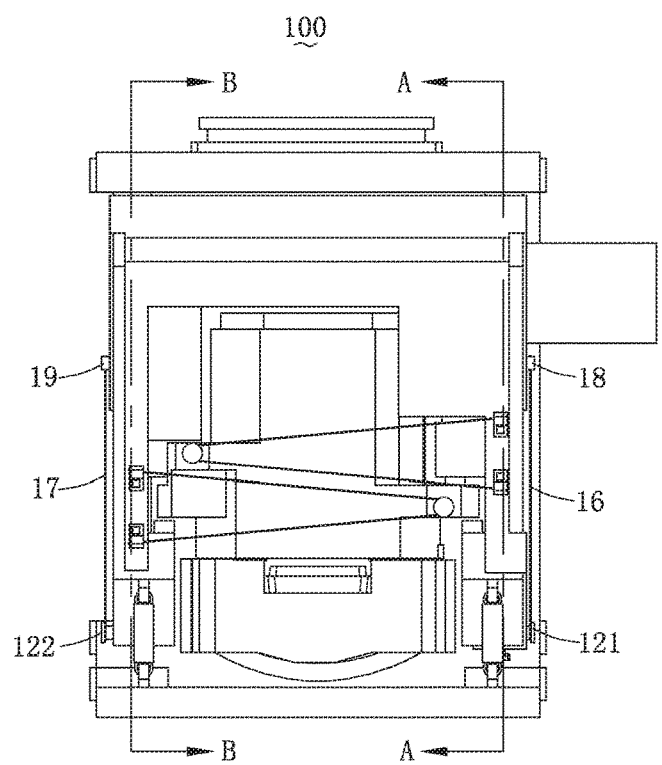
FIG. 3 is a top view of the lens assembly in FIG. 2.
Figure 4:
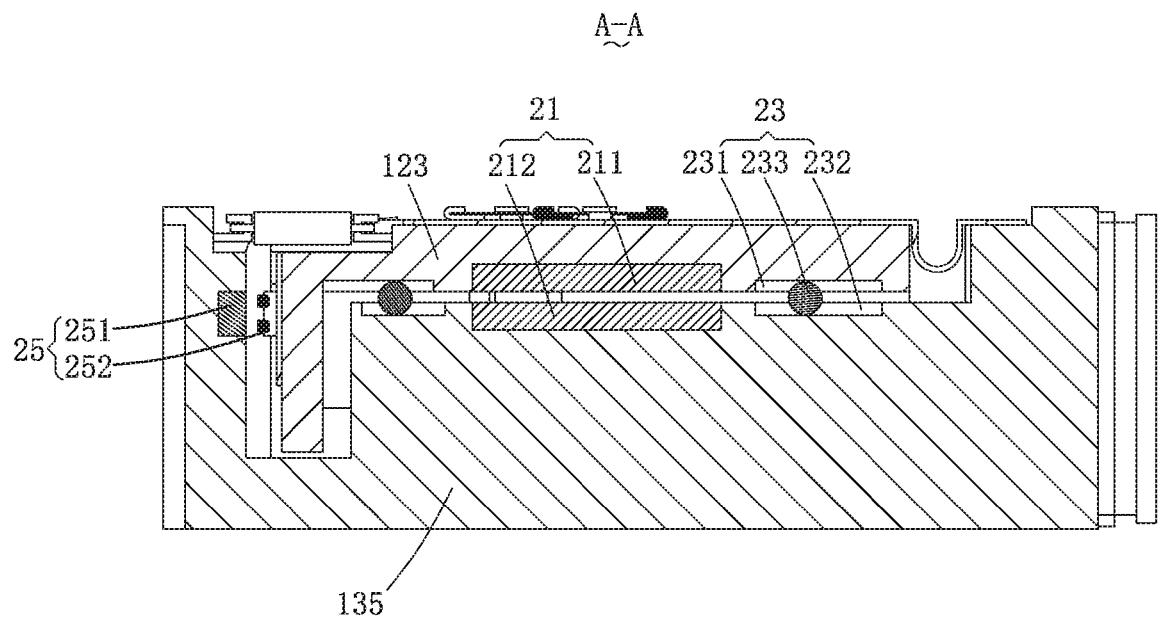
FIG. 4 is a cross-sectional view taken along line A-A in FIG. 3.
Figure 5:
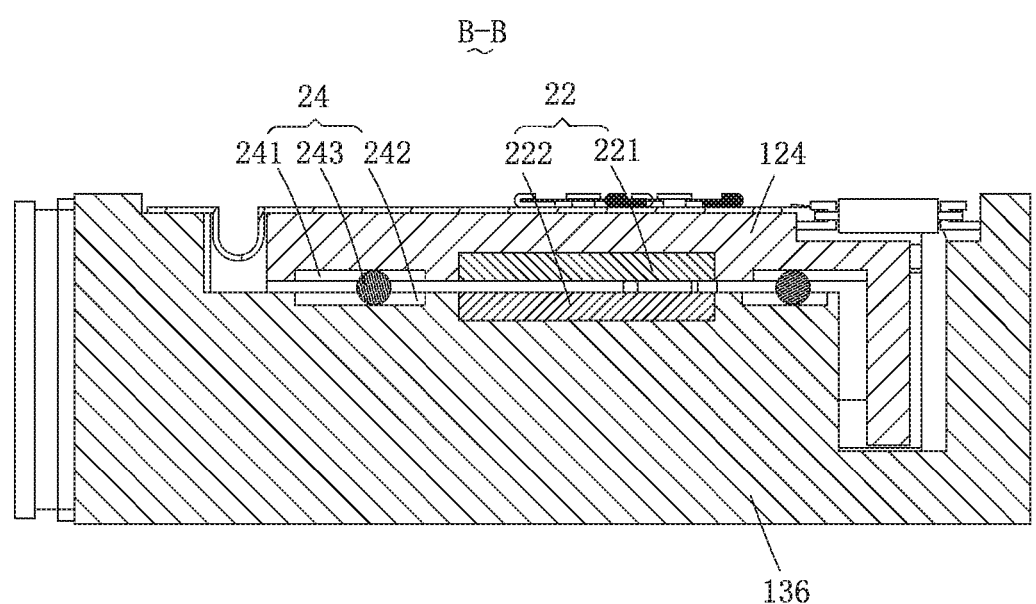
FIG. 5 is a cross-sectional view taken along line B-B in FIG. 3.
Figure 6:
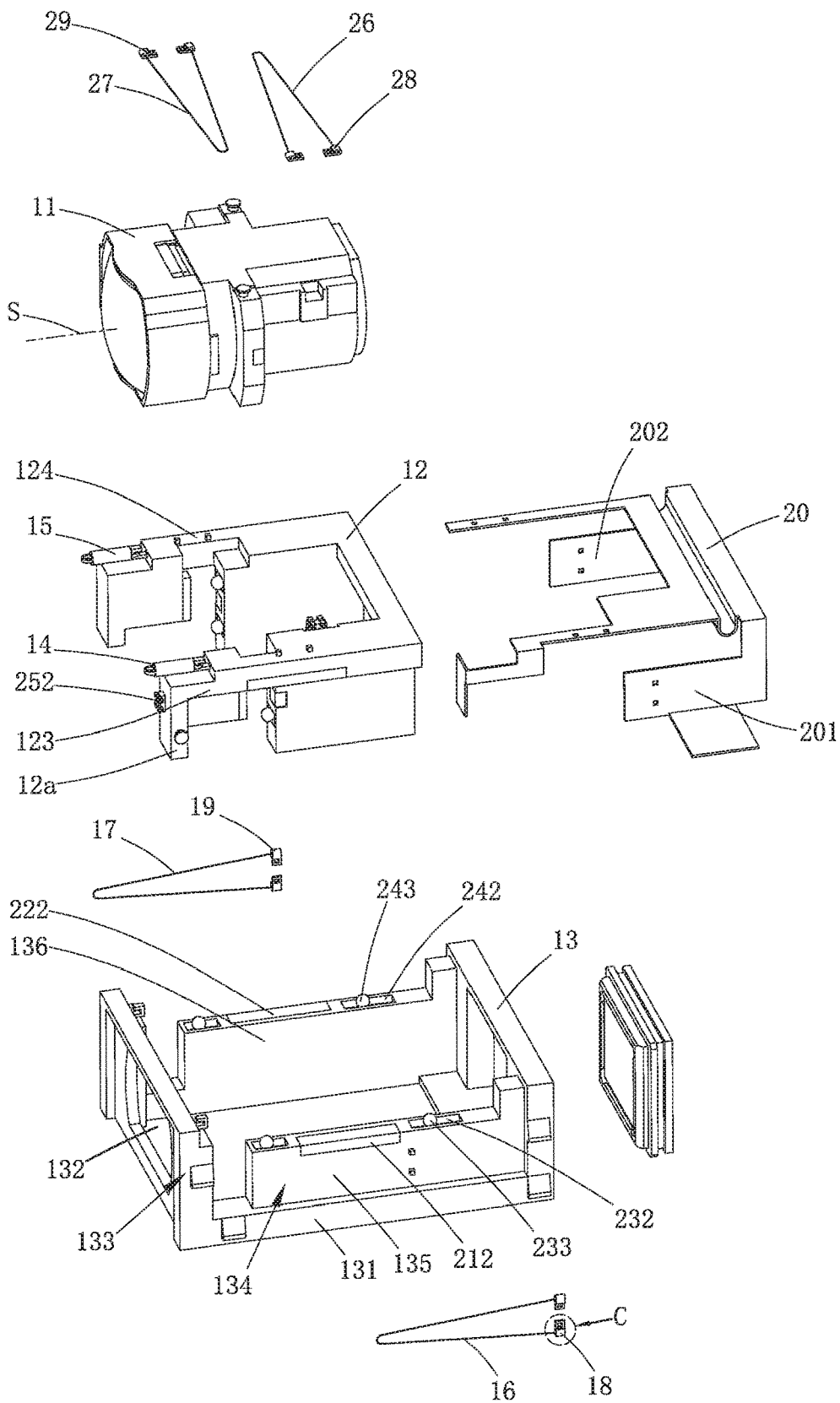
FIG. 6 is an exploded view of the lens assembly of the present invention.
Figure 7:
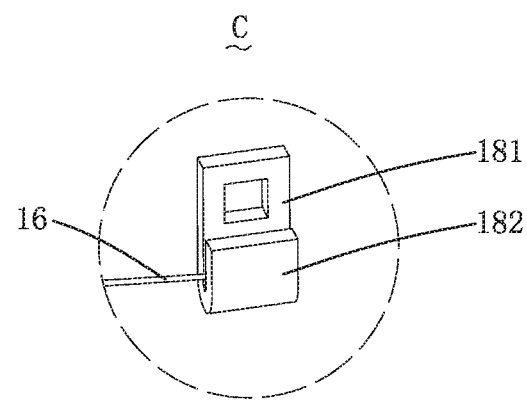
FIG. 7 is an enlarged view of Part C in FIG. 6.
Figure 8:
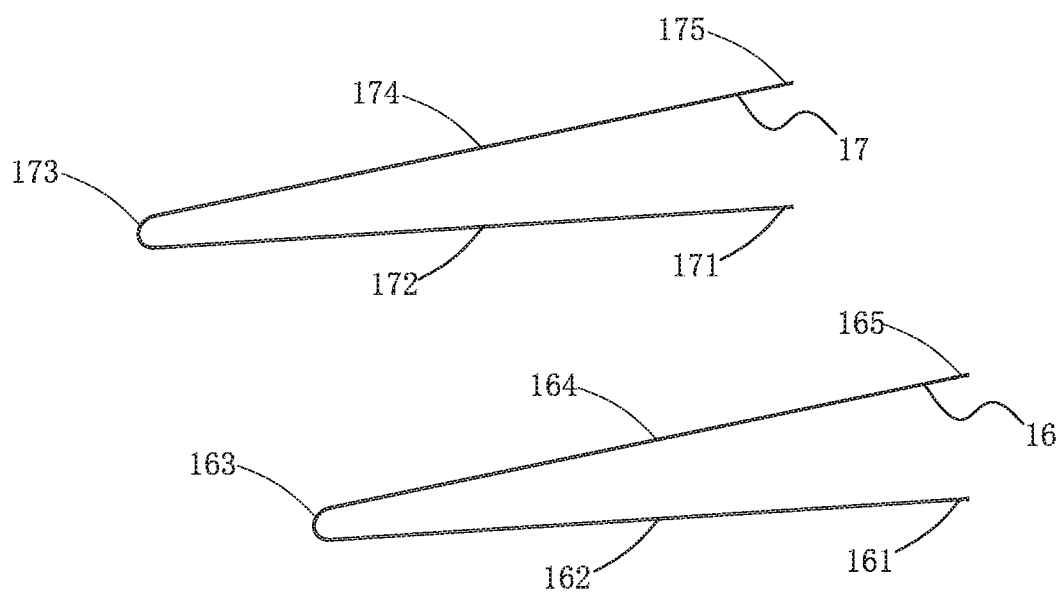
FIG. 8 is an illustration of a first memory alloy wire and a second memory alloy wire of the lens module.
Figure 9:
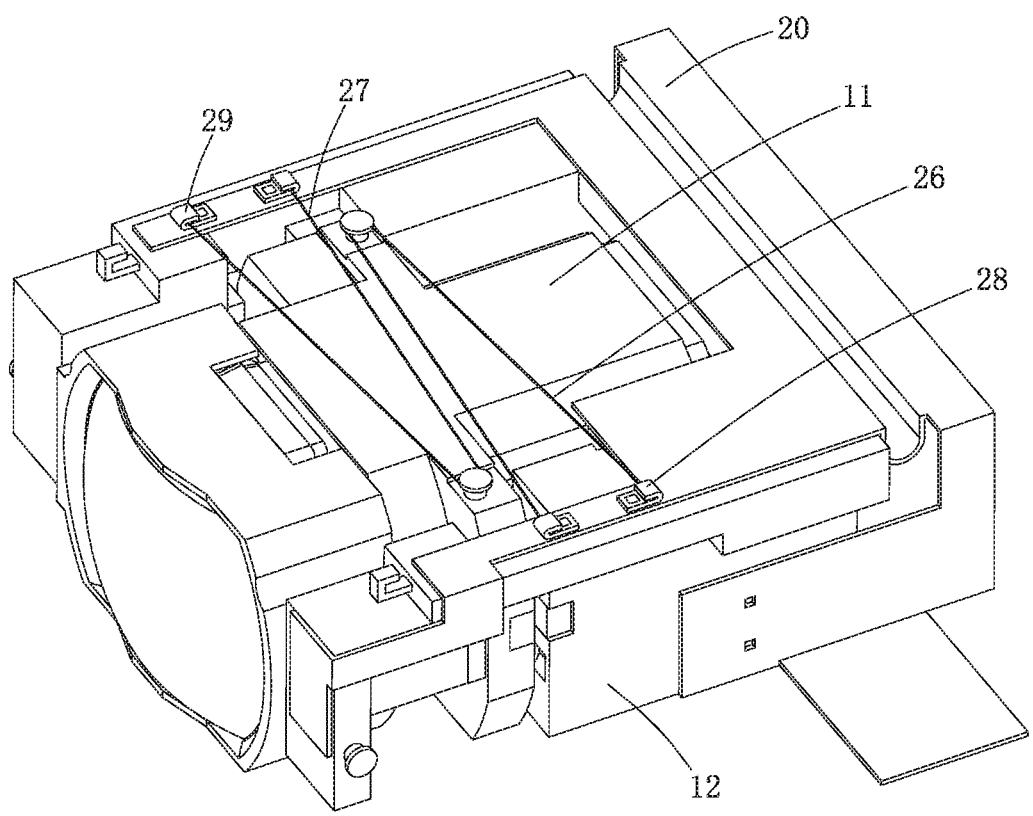
FIG. 9 is an assembled view of a lens, a first substrate, and a circuit board of lens module.
Figure 10:
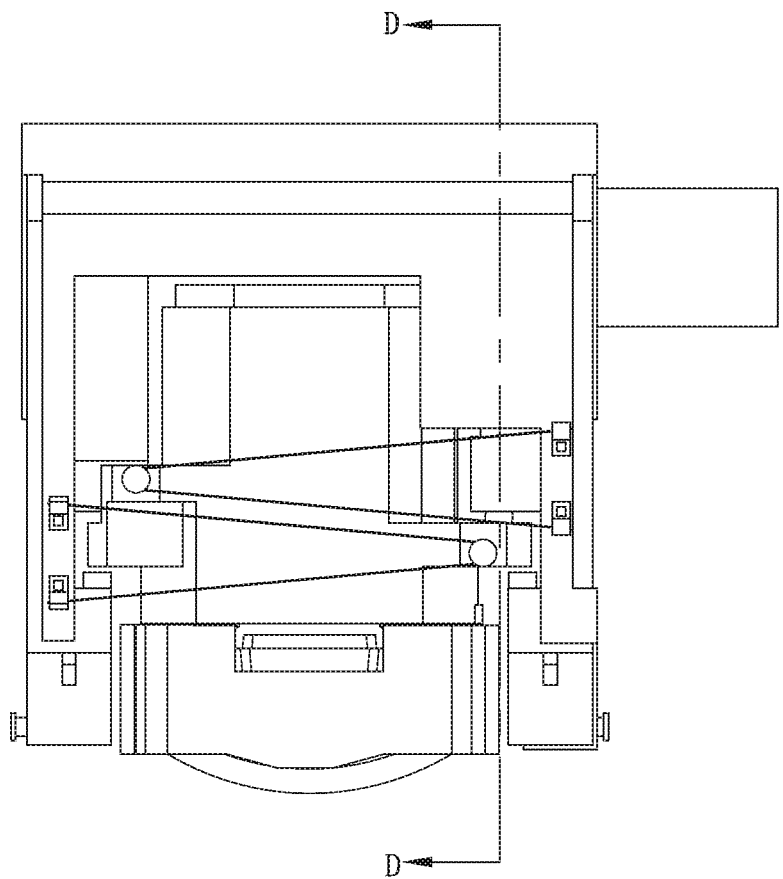
FIG. 10 is a top view of the assembly of the lens, the first substrate, and the circuit board.
Figure 11:
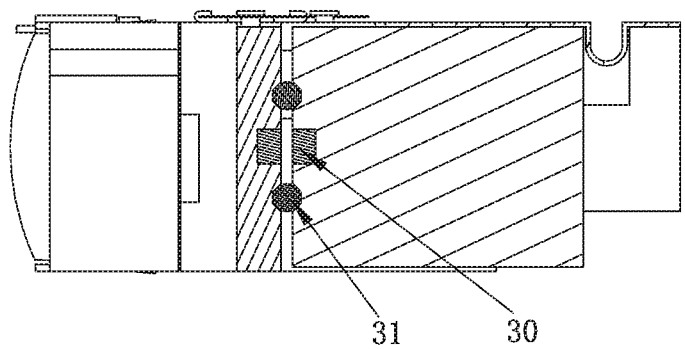
FIG. 11 is a cross-sectional view taken along line D-D in FIG. 10.
Figure 12:
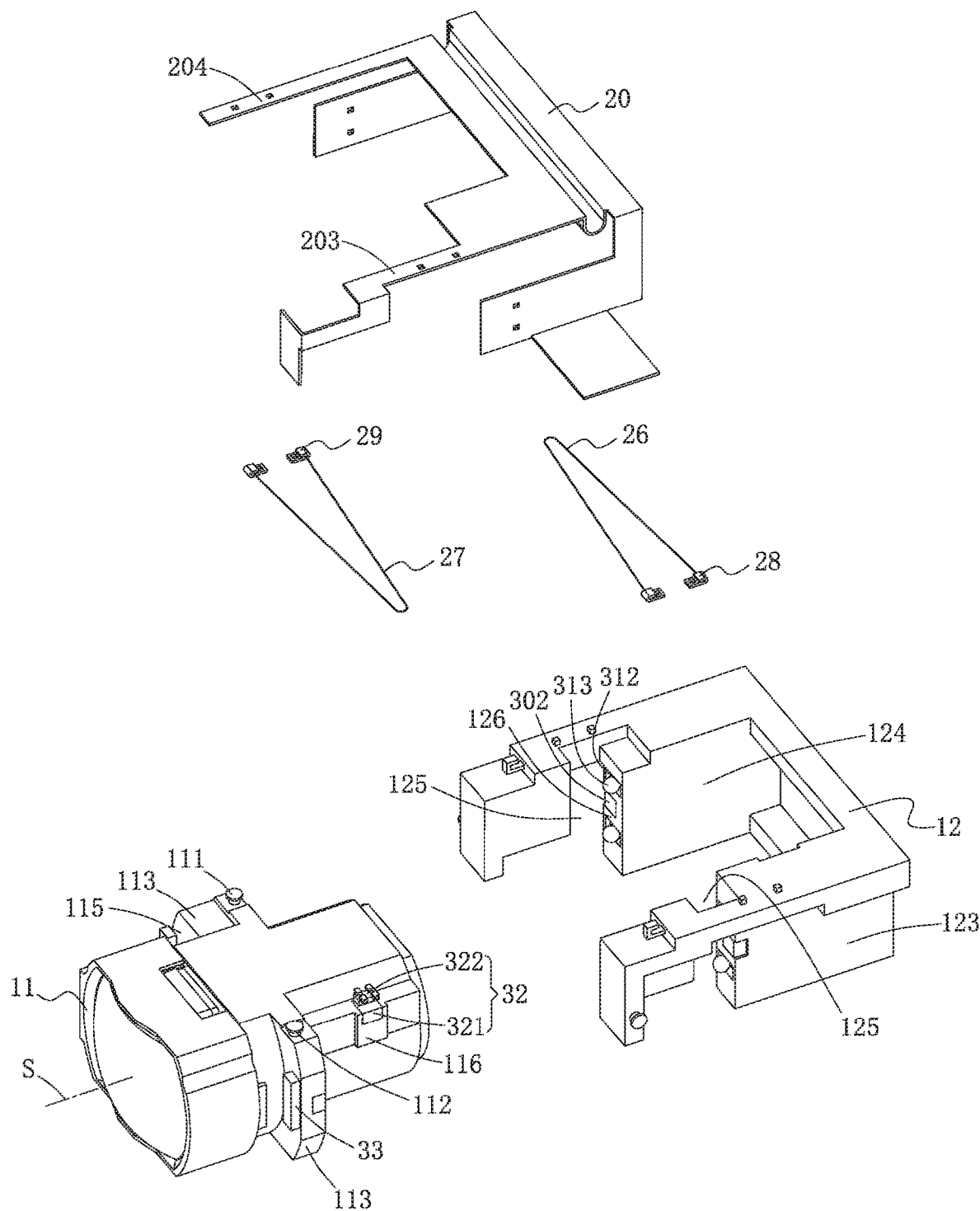
FIG. 12 is an exploded view of the structure shown in FIG. 9.
Figure 13:
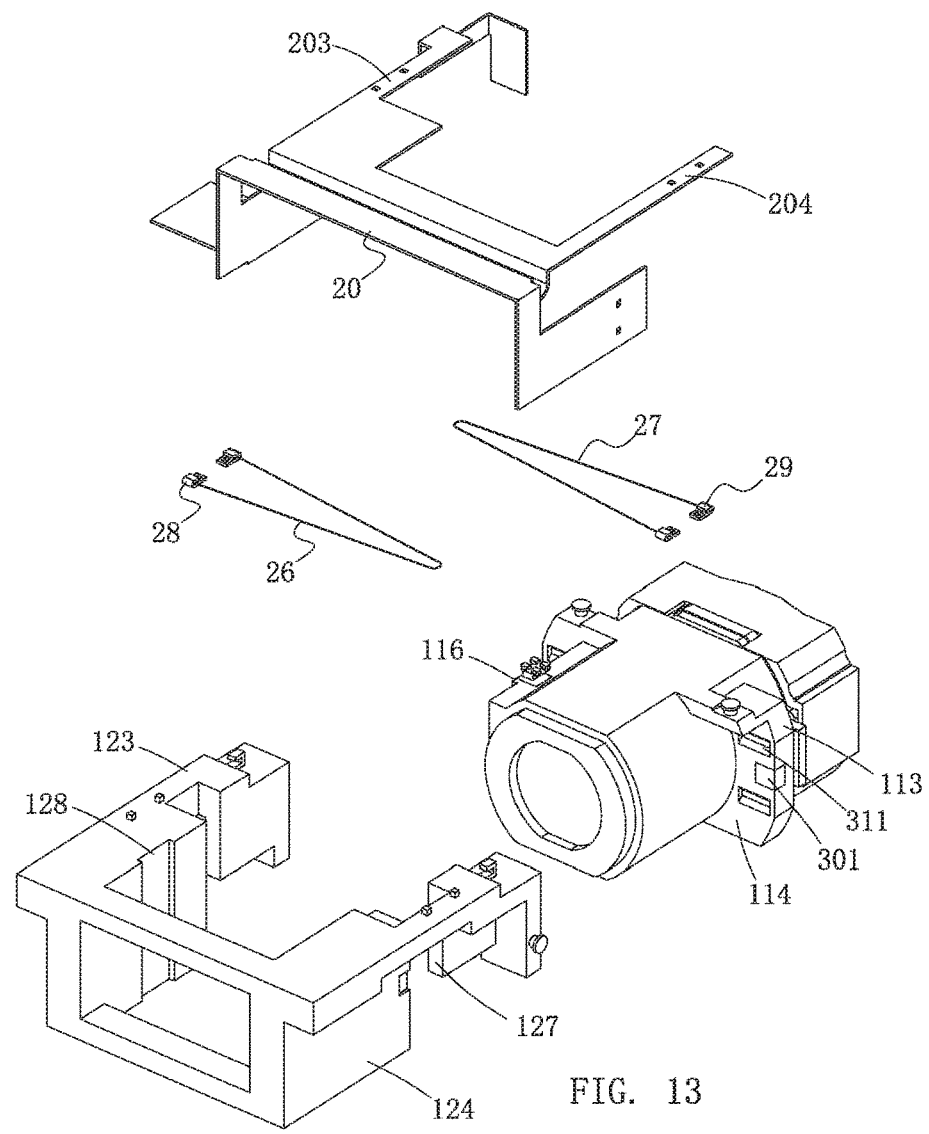
FIG. 13 is an exploded view of the structure shown in FIG. 9 from another aspect.
Figure 14:
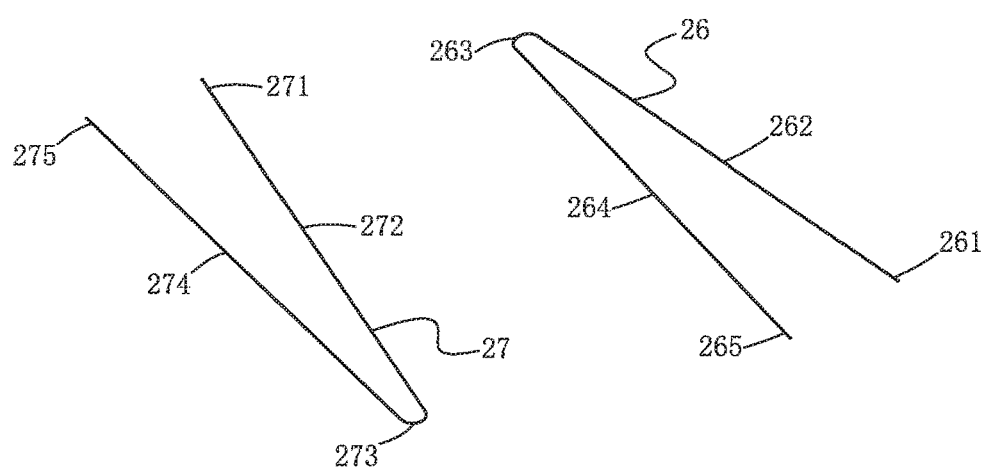
FIG. 14 is an illustrative view of a first memory alloy line and a second memory alloy line of the lens module.

Referring to FIG. 1, an embodiment of the present invention provides a lens module 400, comprising a lens assembly 100 that can implement auto focusing and optical image stabilization, and a housing 300. The housing 300 comprises an upper housing 301, a lower housing 302, and an accommodation space which is used to accommodate the lens assembly 100 and is formed by enclosing the upper housing 301 and the lower housing 302. Both the upper housing 301 and the lower housing 302 are snap-fitted to the lens assembly 100. Specifically, the two sides of the lens assembly 100 are convexly provided with a fastening block 303. Both sides of the upper housing 301 and both sides of the lower housing 302 are all provided with a bayonet 304. The upper housing 301 and the lower housing 302 are snap-fitted to the lens assembly 100 via the cooperation of the fastening block 303 and the bayonet 304.

Please refer to FIGS. 2-8, as an improvement of this embodiment, the lens assembly 100 comprises a lens 11, a first substrate 12, a second substrate 13, a first elastic element 14, a second elastic element 15, a first memory alloy wire 16 and a second memory alloy wire 17. The lens 11 is placed in the first substrate 12. The second substrate 13 comprises a bottom plate 131, a first base body 133 extending from the bottom plate 131 and having a light penetration hole 132, and a second base body 134 that is spaced apart with the first base body 133 in a direction of an optical axis S of the lens 11. The first substrate 12 is slidably mounted at the second base body 134 in the optical axis S. The first substrate 12 comprises an extension arm 12a extending between the first base body 133 and the second base body 134. The first elastic element 14 and the second elastic element 15 are arranged on both sides of the lens 11, respectively. One end of the first elastic element 14 is connected with the first substrate 12, and the other end thereof is connected with the first substrate 133. One end of the second elastic element 15 is connected with the first substrate 12, and the other end thereof is connected with the first base body 133. The first elastic element 14 and the second elastic element 15 are arranged symmetrically. The first memory alloy wire 16 and the second memory alloy wire 17 are symmetrically arranged on both sides of the lens 11. The first memory alloy wire 16 comprises a first fixing part 161 fixed to the second base body 134, a first connection part 162 extending from the first fixing part 161 in a direction of the extension arm 12a, a second fixing part 163 fixed to the extension arm 12a, a second connection part 164 reversely extending from the second fixing part 163 in a direction of the second base body 134, and a third fixing part 165 connected with the second connection part 164 and fixed to the second base body 134. The symmetry axes of the first connection part 162 and the second connection part 164 are parallel to the optical axis S of the lens 11. The second memory alloy wire 17 comprises a fourth fixing part 171 fixed to the second base body 134, a third connection part 172 extending from the fourth fixing part 171 in a direction of the extension arm 12a, a fifth fixing part 173 fixed to the extension arm 12a, a fourth connection part 174 reversely extending from the fifth fixing part 173 in a direction of the second base body 134, and a sixth fixing part 175 connected with the fourth connection part 174 and fixed to the second base body 134. The symmetry axes of the third connection part 172 and the fourth connection part 174 are parallel to the optical axis S of the lens 11.

Initially, the first substrate 12 is placed at the original position of the second substrate 13, that is, the lens 11 is placed at the preset original position. At this time, the first elastic element 14 and the second elastic element 15 are in a stretched state. The first elastic element 14 and the second elastic element 15 have a pretension force. The first memory alloy wire 16 and the second memory alloy wire 17 are in a tight state. During focusing, current is passed into the first memory alloy wire 16 and the second memory alloy wire 17. The first connection part 162, the second connection part 164, the third connection part 172, and the fourth connection part 174 contract in length to pull the first substrate 12 to move opposite to the second substrate 13 in a direction of the optical axis of the lens 11 after being energized. The first substrate 12 drives the lens 11 and the second substrate 13 to undergo relative displacement to achieve focusing of the lens 11. At this time, the first elastic element 14 and the second elastic element 15 are in a stretched state of greater deformation. After the focusing is completed, current is cut off. The first elastic element 14 and the second elastic element 15 pull the first substrate 12 to restore to the original position. The lens 11 restores to the original position together with the first substrate 12.

In this embodiment, the first memory alloy wire 16 and the second memory alloy wire 17 are energized and deformed to drive the lens 11 to move in the direction of the optical axis S to achieve the autofocusing of the lens 11. As compared with the conventional method of using a coil for control, a drive setting method has a simple structure, is easy to install, and can realize the miniaturized design of the lens assembly 100. Moreover, this design method can make the first memory alloy wire 16 and the second memory alloy wire 17 provide an enough drive force without having to bear a large strain force during a process of driving the lens 11 to displace. In addition, by fixing both the first fixing part 161 and the third fixing part 165 of the first memory alloy wire 16 to the same side of the second base body 134, it is convenient to electrically connect a circuit with the first fixing part 161 and the third fixing part 165. Similarly, by arranging the fourth fixing part 171 and the sixth fixing part 175 of the second memory coupling wire 17 on the other side of the second base body 134, it is convenient to electrically connect the circuit with the fourth fixing part 171 and the sixth fixing part 175.

As an improvement of this embodiment, the first connection part 162 and the second connection part 164 are arranged at an angle. A comprised angle of the first connection part 162 and the second connection part 164 is 9.1°±2°, preferably 9.1°. It should be noted that the comprised angle between the first connection part 162 and the second connection part 164 is not limited to the above-mentioned angle value, and can be set at other angles. In general, the smaller the comprised angle, the smaller the strain the first memory alloy wire 16 bears but the greater the stress the first memory alloy wire 16 bears. The comprised angle can be specifically determined according to actual design needs.

As an improvement of this embodiment, the third connection part 172 and the fourth connection part 174 are arranged at an angle. A comprised angle between the third connection part 172 and the fourth connection part 174 is 9.1°±2°, preferably 9.1°. It should be noted that the comprised angle between the third connection part 172 and the fourth connection part 174 is not limited to the above-mentioned angle value, and can be set at other angles. In general, the smaller the comprised angle, the smaller the strain the second memory alloy wire 17 bears, but the greater the stress the second memory alloy wire 17 bears. The comprised angle can be specifically determined according to the actual design needs.

As an improvement of this embodiment, the lens assembly 100 further comprises two first wire connection terminals 18 mounted on one side of the second base body 134 at an interval. The first fixing part 161 and the third fixing part 165 are connected with the two wire connection terminals 18 respectively. Preferably, each of the first wire connection terminals 18 comprises a first clamping part 181 and a second clamping part 182 bent from one end of the first clamping part 181 and extending reversely. The first fixing part 161 or the third fixing part 165 is clamped and fixed between the first clamping part 181 and the second clamping part 182, and this connection method continues to be used below. By arranging the first wire connection terminal 18, on the one hand, it is convenient to connect the first memory alloy wire 16 with the second substrate 13, on the other hand, it is convenient to connect the first memory alloy wire 16 with the circuit. Understandably, it is also possible that the lens assembly 100 is not provided with the first wire connection terminal 18. Both ends of the first memory alloy wire 16 can be fixed on the second substrate 13 by other connection methods.

As an improvement of this embodiment, the lens assembly 100 further comprises two second wire connection terminals 19 mounted on the other side of the second base body 134 at an interval. The fourth fixing part 171 and the sixth fixing part 175 are connected with the two second wire connection terminals 19, respectively. By arranging the second wire connection terminal 19, on the one hand, it is convenient to connect the second memory alloy wire 17 with the second substrate 13. On the other hand, it is convenient to connect the second memory alloy wire 17 with the circuit. Understandably, it is also possible that the lens assembly 100 is not provided with the second wire connection terminal 19. Both ends of the second memory alloy wire 17 can be fixed on the second substrate 13 by other connection methods.

As an improvement of this embodiment, a first convex cylinder 121 is convexly provided on the extension arm 12a on one side of the first substrate 12. A second fixing part 163 is sleeved at the first convex cylinder 121. Preferably, one end of the first convex cylinder 121 away from the lens 11 has a larger diameter, which can prevent the middle part of the first memory alloy wire 16 from falling off the first convex cylinder 121.

As an improvement of this embodiment, a second convex cylinder 122 is convexly provided at the extension arm 12a on the other side of the first substrate 12. The fifth fixing part 173 is sleeved at the second convex cylinder 122. Preferably, one end of the second convex cylinder 122 away from the lens 11 has a larger diameter, which can prevent the middle part of the second memory alloy wire 17 from falling off from the second convex cylinder 122.

As an improvement of this embodiment, the lens assembly 100 further comprises a circuit board 20. The circuit board 20 comprises a first extension part 201 attached to the second base body 134 and a second extension part 202 attached to the other second base body 134. The first fixing part 161 and the third fixing part 165 are indirectly fixed to the second base body 134 via the first extension part 201. The fourth fixing part 171 and the sixth fixing part 175 are indirectly fixed to the second base body 134 via the second extension part 202. The first fixing part 161 and the third fixing part 165 are fixed to the first extension portion 201 of the circuit board 20 via the first wire connection terminal 18. The fourth fixing part 171 and the sixth fixing part 175 are fixed to the second extension part 202 of the circuit board 20 via the second wire connection terminal 19 to realize circuit conduction between the circuit board 20 as well as the first memory alloy wire 16 and the second memory alloy wire 17.

As an improvement of this embodiment, the lens assembly 100 further comprises a first restoring structure 21 and a second restoring structure 22 that are arranged between the first substrate 12 and the second base body 134 for restoring the focused lens 11 and the first substrate 12 to the original position.

As an improvement of this embodiment, the first substrate 12 comprises a first side plate 123 and a second side plate 124 spaced apart from the first side plate 123. The second base body 134 comprises a third side plate 135 arranged on one side of the first side plate 123 away from the second side plate 124 and a fourth side plate 136 arranged on one side of the second side plate 124 away from the first side plate 123. The first restoring structure 21 is provided between the first side plate 123 and the third side plate 135. The first restoring structure 21 comprises a first magnet 211 mounted on one side of the first side plate 123 toward the third side plate 135 and a second magnet 212 mounted on one side of the third side plate 135 toward the first side plate 123 for magnetically adsorb the first magnet 211. The second restoring structure 22 is arranged between the second side plate 124 and the fourth side plate 136. The second restoring structure 22 comprises a third magnet 221 mounted on one side of the second side plate 124 toward the fourth side plate 136 and a fourth magnet 222 mounted on one side of the fourth side plate 136 toward the second side plate 124 for magnetically absorbing the third magnet 221. When the lens 11 is at the original position, the first magnet 211 and the second magnet 212 are arranged directly opposite to each other. The third magnet 221 and the fourth magnet 222 are arranged directly opposite to each other. When the first memory alloy wire 16 and the second memory alloy wire 17 pull the first substrate 12 to be displaced opposite to the second substrate 13, the first magnet 211 and the second magnet 212 are misaligned, and the third magnet 221 and the fourth magnet 222 are misaligned. After the first memory alloy wire 16 and the second memory alloy wire 17 is powered off, by a magnetic force of the second magnet 212 on the first magnet 211 and a magnetic force of the fourth magnet 222 on the third magnet 221 and by cooperating with an elastic force of the first elastic element 14 and the second elastic elements 15, the first substrate 12 and the lens 11 are pulled back to the original position.

As an improvement of this embodiment, a first guiding structure 23 is provided on both sides of the first restoring structure 21. each of the first guiding structures 23 comprises a first guiding groove 231 concavely provided on the first substrate 12 in the direction of the optical axis S, a second guiding groove 232 concavely provided on the second substrate 13 in the direction of the optical axis S, and a first ball 233 embedded between the first guiding groove 231 and the second guiding groove 232. The first guiding groove 231 is concavely provided on one side of the first side plate 123 toward the third side plate 135. The second guiding groove 232 is concavely provided on one side of the third side plate 135 toward the first side plate 123.

As an improvement of this embodiment, a second guiding structure 24 is provided on both sides of the second restoring structure 22. Each of the second guiding structures 24 comprises a third guiding groove 241 concavely provided on the first substrate 12 in the direction of the optical axis S. A fourth guiding grooves 242 concavely provided on the second substrate 13 in the direction of the optical axis S, and a second ball 243 embedded between the third guiding groove 241 and the fourth guiding groove 242. The third guiding groove 241 is specifically concavely provided on one side of the second side plate 124 toward the fourth side plate 136. The fourth guiding groove 232 is specifically concavely provided on one side of the fourth side plate 136 toward the second side plate 124.

By arranging the first guiding structure 23 and the second guiding structure 24, the friction force during the relative movement of the first substrate 12 and the second substrate 13 can be effectively reduced, so that the offset and reset of the first substrate 11 are quicker and more sensitive.

As an improvement of this embodiment, the lens assembly 100 further comprises a focus detection mechanism 25 for detecting the moving distance of the first substrate 12 in the direction of the optical axis S. The focus detection mechanism 25 comprises a fifth magnet 251 provided on the second substrate 13 and a first Hall sensor 252 arranged on the first substrate 12 and aligned with the fifth magnet 251. The focus detection mechanism 25 is used to detect the offset of the first substrate 12 toward the second substrate to control the current flowing into the first memory alloy wire 16 and the second memory alloy wire 17. Therefore, the lens 11 can accurately reach a focus position, improving the imaging quality of the lens 11. The first Hall sensor 252 is indirectly mounted on the first substrate 12 via the circuit board 20. Specifically, the first extension part 201 of the circuit board 20 extends to the surface of the first side plate 123 of the first substrate 12 toward the first base body 133. The first Hall sensor 252 is connected with the first extension part 201. The fifth magnet 251 is mounted on the first base body 133.

Please refer to FIGS. 9-14, as an improvement of this embodiment, the lens assembly 100 further comprises a first memory alloy line 26 and a second memory alloy line 27. The lens 11 is placed between the first side plate 123 and the second side plate 124. The first memory alloy line 26 comprises a first fixing end 261 fixed on the first side plate 123, a first extension section 262 extending from the first fixing end 261 in a direction of the second side plate 124 and suspended above the lens 11, a second fixing end 263 fixed to one side of the lens 11 close to the second side plate 124, a second extension section 264 reversely extending from the second fixing end 263 in a direction of the first side plate 123 and suspended above the lens 11, and a third fixing end 265 connected with the second extension section 264 and fixed to the first side plate 123. The symmetry axes of the first extension section 262 and the second extension section 264 are perpendicular to the optical axis S. The second memory alloy line 27 comprises a fourth fixing end 271 fixed to the second side plate 124, a third extension section 272 extending from the fourth fixing end 271 in the direction of the first side plate 123 and suspended above the lens 11, a fifth fixing end 273 fixed to one side of the lens 11 close to the first side plate 123, a fourth extension section 274 reversely extending from the fifth fixing end 273 in the direction of the second side plate 124 and suspended above the lens 11, and a sixth fixing end 275 connected with the fourth extension section 274 and fixed to the second side plate 124. The symmetry axes of the third extension section 272 and the fourth extension section 274 are perpendicular to the optical axis S.

Specifically, when the lens 11 is not offset, the lens 11 is placed at the original position of the first substrate 12, and the first memory alloy line 26 and the second memory alloy line 27 are in a relaxed state. When the lens 11 faces the first side plate 123 or the second side plate 124 is deflected, for example, when the lens 11 is deflected toward the first side plate 123, the second memory alloy line 27 is elongated. At this time, current flows into the second memory alloy line 27. The second memory alloy line 27 generates heat due to energization, deforms according to the own physical characteristics thereof, shortens the length thereof, and pulls the lens 11 back to the original position to realize the optical image stabilization of the lens 11.

In this embodiment, the first memory alloy line 26 and the second memory alloy line 27 are energized and deformed to drive the lens 11 to move in a direction perpendicular to the optical axis S to achieve the optical image stabilization. Compared with the conventional method of using an image stabilization coil, this drive setting method has a simple structure, is easy to install, and can realize the miniaturized design of the lens assembly 100. Moreover, this design method can make the first memory alloy line 26 and the second memory alloy line 27 provide a sufficient drive force without having to bear the large strain force during the process of driving the lens 11 to displace. In addition, by fixing the first fixing end 261 and the third fixing end 265 of the first memory alloy line 26 to the same side of the second base body 134, it is convenient to electrically connect the circuit with the first fixing end 261 and the third fixing end 265. Similarly, by arranging the fourth fixing end 271 and the sixth fixing end 275 of the second memory coupling wire 27 on the other side of the second base body 134, it can be convenient to electrically connect the circuit with the fourth fixing end 271 and the sixth fixing end.

The first extension section 262 and the second extension section 264 are arranged at an angle. A comprised angle between the first extension section 262 and the second extension section 264 is 10.4°±2°, preferably 10.4°. It should be noted that the comprised angle between the first extended section 262 and the second extended section 264 is not limited to the above-mentioned angle value, but can also be set to other angles. In general, the smaller the comprised angle, the smaller the strain the first memory alloy line 26 bears, but the greater the stress the first memory alloy line 26 bears. The comprised angle can be specifically determined according to the actual design needs.

The third extension section 272 and the fourth extension section 274 are arranged at an angle. A comprised angle between the third extension section 272 and the fourth extension section 274 is 10.4°±2°, preferably 10.4°. It should be noted that the comprised angle between the third extended section 272 and the fourth extended section 274 is not limited to the above-mentioned angle, and can be set at other angles. In general, the smaller the comprised angle, the smaller the strain the second memory alloy line 27 bears, but the greater the stress the second memory alloy line 27 bears. The comprised angle can be specifically determined according to the actual design needs.

As an improvement of this embodiment, the lens assembly 100 further comprises two first electricity connection terminals 28 mounted on the first side plate 123 at an interval. The first fixing end 261 and the third fixing end 265 of the first memory alloy line 26 are connected with the two first electricity connection terminals 28, respectively. By arranging the first electricity connection terminal 28, on the one hand, it is convenient to connect the first memory alloy line 26 with the first side plate 123, and on the other hand, it is convenient to connect the first memory alloy line 26 with the circuit. Understandably, it is also possible that the lens assembly 100 is not provided with the first electricity connection terminal 28. Both ends of the first memory alloy line 26 can be fixed on the first side plate 123 by other connection methods.

As an improvement of this embodiment, the lens assembly 100 further comprises two second electricity connection terminals 29 mounted on the second side plate 124 at an interval. The fourth fixing end 271 and the sixth fixing end of the second memory alloy line 27 are connected with the two second electricity connection terminals 29, respectively. By arranging the second electricity connection terminal 29, on the one hand, it is convenient to connect the second memory alloy line 27 with the second side plate 124, and on the other hand, it is convenient to connect the second memory alloy wire 20 with the circuit. Understandably, it is also possible that the lens assembly 100 is not provided with the second electricity connection terminal 29. Both ends of the second memory alloy line 27 can be fixed on the second side plate 124 by other connection methods.

As an improvement of this embodiment, a first convex column 111 is convexly provided at one side of the lens 11 away from the first side plate 123. the second fixing end 263 of the first memory alloy line 26 is suspended from the first convex column 111. Preferably, one end of the first convex column 111 away from the lens 11 has a larger diameter, which can prevent the first memory alloy line 26 from falling off the first convex column 111.

As an improvement of this embodiment, a second convex column 112 is protruded from the side of the lens 11 away from the second side plate 124. the fifth fixing part 273 of the second memory alloy line 27 is suspended from the second convex column 112. Preferably, one end of the second convex column 112 away from the lens 11 has a larger diameter, which can prevent the second memory alloy line 27 from falling off from the second convex column 112.

As an improvement of this embodiment, the circuit board 20 further comprises a first extension portion 203 attached to the first side plate 123 and a second extension portion 204 attached to the second side plate 124. the first fixing end 261 and the third fixing end 265 are indirectly fixed to the first side plate 123 via the first extension portion 203. the fourth fixing end 271 and the sixth fixing end 275 are indirectly fixed to the second side plate 124 via the second extension portion 204. specifically, the first fixing end 261 and the third fixing end 265 are fixed to the first extension portion 203 of the circuit board 20 via the first electricity connection terminal 28. the fourth fixing end 271 and the sixth fixing end 275 are fixed to the second extension portion 204 of the circuit board 20 via the second wire connection terminal 29.

As an improvement of this embodiment, the lens assembly 100 further comprises a third restoring structure 30 mounted between the lens 11 and the first substrate 12 for cooperating with the first memory alloy line 26 and the second memory alloy line 27 to restore the deflected lens 11 to the original position.

Both the first side plate 123 and the second side plate 124 are provided with first grooves 125 thereon. The opposite sides of the lens 11 are reversely and convexly provided with a first convex part 113. The two first convex parts 113 are embedded in two first grooves 125, respectively. Each of the first groove 125 comprises a first side surface 126 and a second side surface 127 spaced apart in the direction of the optical axis S. Each of the first convex part 113 comprises a first surface 114 oppositely arranged at the first side surface 126 and a second surface 115 oppositely arranged at the second side surface 127. Each set of the first surface 114 and the first side surface 126*t* that are oppositely arranged are provided with the third restoring structure 30. Each of the third restoring structures 30 comprises a sixth magnet 301 arranged on the first surface 114 and a seventh magnet 302 arranged on the first side 126 for magnetically absorbing the sixth magnet 301. When the lens 11 is placed at the original position, the sixth magnet 301 and the seventh magnet 302 are positioned in alignment with each other. When the lens 11 is deflected toward the first side plate 123 or the second side plate 124, for example, when the lens 11 is defected toward the first side plate 123, the sixth magnet 301 and the seventh magnet 302 are misaligned. After the sixth magnet 301 and the seventh magnet 302 cooperate with each other and are energized, the second memory alloy line 27 pulls the lens 11 back to the original position. By arranging the third restoring structure 30, the stress which the first memory alloy line 26 and the second memory alloy line 27 bear can be reduced.

As an improvement of this embodiment, each of the third restoring structures 30 is provided with a third guiding structure 31 on both sides thereof. Each of the third guiding structures 31 comprises a five guiding groove 311 concavely provided at the lens 11 in the moving direction of the lens 11, a sixth guiding groove 312 concavely provided at the first substrate 12 along the moving direction of the lens 11, and a third ball 313 embedded between the fifth guiding groove 311 and the sixth guiding groove 312. By arranging the third guiding structure 31, the friction force generated when the lens 11 and the first substrate 12 move relative to each other can be effectively reduced, so that the lens 11 can be restored more quickly, and the stabilization response of the lens 11 can be more sensitive. The fifth guiding groove 311 has the first surface concavely provided on the lens 11. The sixth guiding groove 312 is specifically concavely provided on the first side surface 126 of the first substrate 12.

As an improvement of this embodiment, the lens assembly 100 further comprises a stabilization detection mechanism 32 for detecting whether the lens 11 is deflected in a direction perpendicular to the optical axis S. on the one hand, the stabilization detection mechanism 32 is used to detect whether the lens 11 is deflected toward the first side plate 123 or toward the second side plate 124 to control whether the current flows into the first memory alloy line 26 or the second memory alloy line 27. On the other hand, the stabilization detection mechanism 32 is also used to detect how much the lens 11 is deflected toward the first side plate 123 or the second side plate 124 to control the current flowing into the first memory alloy line 26 or the second memory alloy line 27 so that the lens 11 can be pulled back to the original position more accurately.

Specifically, the stabilization detection mechanism 32 comprises an eighth magnet 321 provided on the lens 11 and a second hall sensor 322 provided on the circuit board 20 and aligned with the eighth magnet 321.

The side of the lens 11 toward the first side plate 123 is convexly provided with a second convex part 116 spaced apart at the first convex part 113. The eighth magnet 321 is mounted at the second convex part 116. The surface of the first side plate 123 toward the second convex part 116 is concavely provided with an avoidance slot 128 corresponding to the second convex part.

As an improvement of this embodiment, each of the second side surfaces 127 is provided with a blocker 33 that restricts the lens 11 from impacting the second side 127 to move. The blocker 33 can prevent the lens 11 from more greatly displacing toward the second side surface when an apparatus installed with the lens assembly 100 drops, resulting in an excessive distance between the first surface 114 and the first side surface 126. The third ball 313 breaks away from the fifth guiding groove 311 and the sixth guiding groove 312.

An embodiment of the present invention also provides a method for autofocusing the above lens assembly, comprising: pass current into two memory alloy wires, wherein the first connection part and the second connection part of the each of the memory alloy wires contract in length to pull the lens and the first substrate to move in a direction of the second base body after being energized, and the two elastic elements stretch elastically to achieve focusing of the lens; and turn off the current after focusing is completed, wherein the two elastic elements pull the first substrate to restore to the original position, and the lens restores to the original position with the first substrate.

An embodiment of the present invention also provides an optical image stabilization method for the above lens assembly, comprising: when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized; when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

The above are only the embodiments of the present invention. It should be pointed out that the ordinary technician in the art can make improvements without departing from the inventive concept of the present invention, which though belongs to the scope of protection of the present invention.

What is claimed is:
1. A lens assembly, comprising:
a lens;
a first substrate attached to the lens, including a first side plate placed at one side of the lens and a second side plate placed at another side of the lens;
a first memory alloy wire having a first fixing end fixed on the first side plate, a first extension section extending from the first fixing end in a direction of the second side plate and suspended above the lens, a second fixing end fixed to one side of the lens close to the second side plate, a second extension section reversely extending from the second fixing end in a direction of the first side plate and suspended above the lens, and a third fixing end connected with the second extension section and fixed to the first side plate;
a second memory alloy wire having a fourth fixing end fixed on the second side plate, a third extension section extending from the fourth fixing end in the direction of the first side plate and suspended above the lens, a fifth fixing end fixed to the side of the lens close to the first side plate, a fourth extension section reversely extending from the fifth fixing end in the direction of the second side plate and suspended above the lens, and a sixth fixing end connected with the fourth extension section and fixed to the second side plate;
a restoring structure arranged between the lens and the first substrate to cooperate with the first memory alloy wire and the second memory alloy wire to restore deviated lens to an original position, wherein
a symmetry axes of the first extension section and the second extension section are perpendicular to an optical axis of the lens; and
a symmetry axes of the third extension section and the fourth extension section are perpendicular to the optical axis of the lens.

2. The lens assembly as described in claim 1 further including
a circuit board, wherein the circuit board comprises a first extension portion attached to the first side plate and a second extension portion attached to the second side plate; the first fixing end and the third fixing end of the first memory alloy wire are indirectly fixed to the first side plate via the first extension portion, and the fourth fixing end and the sixth fixing end of the second memory alloy wire are indirectly fixed to the second side plate via the second extension portion.

3. The lens assembly as described in claim 2 further comprising
a first electricity connection terminal provided on the first side plate, and a second electricity connection terminal provided on the second side plate; wherein
the first fixing end and the third fixing end are fixed on the circuit board via the first electricity connection terminal, respectively; and the fourth fixing end and the sixth fixing end are fixed on the circuit board via the second electricity connection terminal, respectively.

4. The lens assembly as described in claim 1, wherein
one side of the lens away from the first side plate is convexly provided with a first convex column;
the second fixing end is sleeved at the first convex column;
one side of the lens away from the second side plate is convexly provided with a second convex column, and the fifth fixing end is sleeved at the second convex column.

5. The lens assembly as described in claim 1, wherein
the first side plate and the second side plate are both provided with a first groove thereon;
opposite sides of the lens are convex and reversely provided with a first convex part, the two first convex parts are embedded in the two corresponding first grooves, respectively;
each of the first grooves comprises a first side surface and a second side surface that are spaced apart along the optical axis, each of the first convex parts comprises a first surface arranged opposite to the first side surface and a second surface arranged opposite to the second side surface;
each of the restoring structure is provided between a surface and the first side surface, and each of the restoring structures comprises a first magnet provided on the first surface and a second magnet provided on the first side surface and magnetically adsorbing the first magnet.

6. The lens assembly as described in claim 1 further comprising
a rolling structure having a first guiding groove that is concavely provided on the lens along a moving direction of the lens, a second guiding groove that is concavely provided at the first substrate along the moving direction of the lens, and a ball embedded between the first guiding groove and the second guiding groove.

7. The lens assembly as described in claim 5 further comprising
a rolling structure having a first guiding groove that is concavely provided on the lens along a moving direction of the lens, a second guiding groove that is concavely provided at the first substrate along the moving direction of the lens, and a ball embedded between the first guiding groove and the second guiding groove.

8. The lens assembly as described in claim 5, wherein
each of the second side surfaces is provided with a blocker that restricts the lens from impacting the second side surface.

9. The lens assembly as described in claim 2 further comprising
a stabilization detection mechanism for detecting whether the lens is deflected in a direction perpendicular to the optical axis, wherein the stabilization detection mechanism comprises a third magnet arranged on the lens and a Hall sensor arranged on the circuit board and arranged in alignment with the third magnet.

10. An optical image stabilization method for a lens assembly described in claim 1, wherein
when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;
when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

11. An optical image stabilization method for a lens assembly described in claim 2, wherein
when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;
when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

12. An optical image stabilization method for a lens assembly described in claim 3, wherein
when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;
when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

13. An optical image stabilization method for a lens assembly described in claim 4, wherein
when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;
when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

14. An optical image stabilization method for a lens assembly described in claim 1, wherein
when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;
when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

15. An optical image stabilization method for a lens assembly described in claim 5, wherein when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;

when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

16. An optical image stabilization method for a lens assembly described in claim 6, wherein when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;

when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

17. An optical image stabilization method for a lens assembly described in claim 7, wherein when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;

when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

18. An optical image stabilization method for a lens assembly described in claim 8, wherein when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;

when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

19. An optical image stabilization method for a lens assembly described in claim 9, wherein when the lens is deflected toward the second side plate, the first memory alloy wire is elongated, and by energizing the first memory alloy wire, the first extension section and the second extension section contract in length to pull the lens to move toward the first side plate to the original position to achieve stabilization after being energized;

when the lens is deflected toward the first side plate, the second memory alloy wire is elongated, and by energizing the second memory alloy wire, the third extension section and the fourth extension section contract in length to pull the lens to move toward the second side plate to the original position to achieve stabilization.

* * * * *